United States Patent
Khurange et al.

(10) Patent No.: US 10,324,802 B2
(45) Date of Patent: Jun. 18, 2019

(54) METHODS AND SYSTEMS OF A DEDUPE STORAGE NETWORK FOR IMAGE MANAGEMENT

(71) Applicants: Ashish Govind Khurange, Pune (IN); Kuldeep Sureshrao Nagarkar, Pune (IN); Sachin Baban Durge, Pune (IN); Ravender Goyal, Saratoga, CA (US)

(72) Inventors: Ashish Govind Khurange, Pune (IN); Kuldeep Sureshrao Nagarkar, Pune (IN); Sachin Baban Durge, Pune (IN); Ravender Goyal, Saratoga, CA (US)

(*) Notice: Subject to any disclaimer, the term of this patent is extended or adjusted under 35 U.S.C. 154(b) by 578 days.

(21) Appl. No.: 14/701,530

(22) Filed: May 1, 2015

(65) Prior Publication Data

US 2016/0321140 A1 Nov. 3, 2016

(51) Int. Cl.
*G06F 16/00* (2019.01)
*G06F 11/14* (2006.01)
*H04L 29/08* (2006.01)

(52) U.S. Cl.
CPC ...... *G06F 11/1448* (2013.01); *H04L 67/1095* (2013.01); *H04L 67/1097* (2013.01)

(58) Field of Classification Search
CPC .......................... G06F 3/0613; H04L 67/1095
See application file for complete search history.

(56) References Cited

U.S. PATENT DOCUMENTS

| | | | | |
|---|---|---|---|---|
| 5,202,982 A | * | 4/1993 | Gramlich | G06F 17/30171 |
| 8,930,648 B1 | * | 1/2015 | Storer | G06F 12/0292 711/154 |
| 2012/0117029 A1 | * | 5/2012 | Gold | G06F 11/1451 707/651 |
| 2013/0091102 A1 | * | 4/2013 | Nayak | G06F 3/0613 707/692 |
| 2014/0149794 A1 | * | 5/2014 | Shetty | H04L 67/1095 714/20 |
| 2015/0106345 A1 | * | 4/2015 | Trimble | G06F 17/30156 707/692 |
| 2016/0077926 A1 | * | 3/2016 | Mutalik | G06F 11/1456 711/162 |
| 2016/0188668 A1 | * | 6/2016 | Sharangpani | G06F 17/30153 707/718 |

* cited by examiner

*Primary Examiner* — Tarek Chbouki

(57) ABSTRACT

In one embodiment, a computer-implemented method of a dedupe storage network includes the step of providing one or more replication-site dedupe storage nodes. Another step includes providing an onsite-dedupe storage node, wherein the onsite dedupe node initiates a replication operation, wherein the replication operation comprises the onsite dedupe storage node operation pushing or fetching a dedupe-image data from the one or more replication-site dedupe storage nodes. The replication from local dedupe storage node to remote dedupe storage node pushes data not present at remote. The replication from remote dedupe storage node to local dedupe storage node fetches data not present at local.

9 Claims, 6 Drawing Sheets

CREATE A COPY OF METADATA OF DEDUPE IMAGE 'X" FROM REMOTE FS TO LOCAL FS
402

FROM EACH OF THE DATA CHUNK INCLUDED IN THE DEDUPE IMAGE 'X', CHECK IF THAT DATA CHUNK IS AVAILABLE ON ONSITE BY USING THE LOCAL FS DATABASE AND/ OR BY CHECKING EXISTENCE OF DATA CHUNK ON DISK USING THE PREDEFINED PATHNAME FOR THE CHUNK BASED ON HASHING ALGORITHM
404

PREPARE THE LIST OF CHUNKS WHICH ARE NOT AVAILABLE ON ONSITE AS *DOWNLOAD_LIST*
406

COPY ALL CHUNKS INCLUDED IN *DOWNLOAD_LIST* THE FROM REPLICATION SITE TO ONSITE MAINTAINING THE ORIGINAL PATH LOCATION AND PREPARE THE LIST OF CHUNKS WHICH ARE SUCCESSFULLY DOWNLOADED IN THE *DOWNLOADED_LIST*
408

ADD ALL THE CHUNKS INCLUDED IN THE DOWNLOADED_LIST TO THE LOCAL FS DATABASE IN: /LOCAL_SUREFS/DB
410

IF NOT ALL CHUNKS FROM *DOWNLOAD_LIST* GOT DOWNLOADED SUCCESSFULLY GO TO STEP 404
412

METHODS AND SYSTEMS OF A DEDUPE STORAGE NETWORK FOR IMAGE MANAGEMENT

BACKGROUND

1. Field

This application relates generally to data storage, and more specifically to a system, article of manufacture and method of methods and systems of a dedupe storage network for image management.

2. Related Art

In a data protection system there may be a need to replicate a backup images across sites. Various reasons for the multiple site image backup can include, inter alia: long term retention of data by retiring it to data archival site for compliance reasons; reclaiming, storage space on onsite backup appliance by retiring older but yet required images to remote site; maintaining a copy of all the backup images to a remote site to make the onsite backup appliance disaster proof; building a central repository of important data for a branch office-remote office scenario, etc. If the data protection system uses dedupe storage to store the backup images, the replication functionality can be optimized using dedupe property of backup images. Accordingly, systems and methods are provided herein that can provide a dedupe storage network given any graph network topology.

BRIEF SUMMARY OF THE INVENTION

In one embodiment, a computer-implemented method of a dedupe storage network includes the step of providing one or more replication-site dedupe storage nodes. Another step includes providing an onsite-dedupe storage node, wherein the onsite dedupe node initiates a replication operation, wherein the replication operation comprises the onsite dedupe storage node operation pushing or fetching a dedupe-image data from the one or more replication-site dedupe storage nodes. Another step includes storing the dedupe image in the onsite-dedupe storage node represented in a local dedupe-image layout, wherein the local dedupe-image layout comprises a metadata element, a data element and a database element. Another step includes replicating the dedupe image in the one or more replication-site dedupe storage nodes, wherein a replicated dedupe image is represented in a remote dedupe-image layout comprising a remote-metadata element and a remote-database element.

Optionally, the dedupe storage network includes an inline deduplication file system that converts an incoming backup stream to a dedupe image without requiring a staging location and stores the incoming backup stream by a chunkwise deduplication operation. The dedupe storage network comprises a mesh-network topology in which each node relays data for the dedupe storage network.

BRIEF DESCRIPTION OF THE DRAWINGS

FIG. 4 illustrates an example process of how an image can become a locally-available dedupe image to the replication site after uploading, according to some embodiments.

Figure 1:
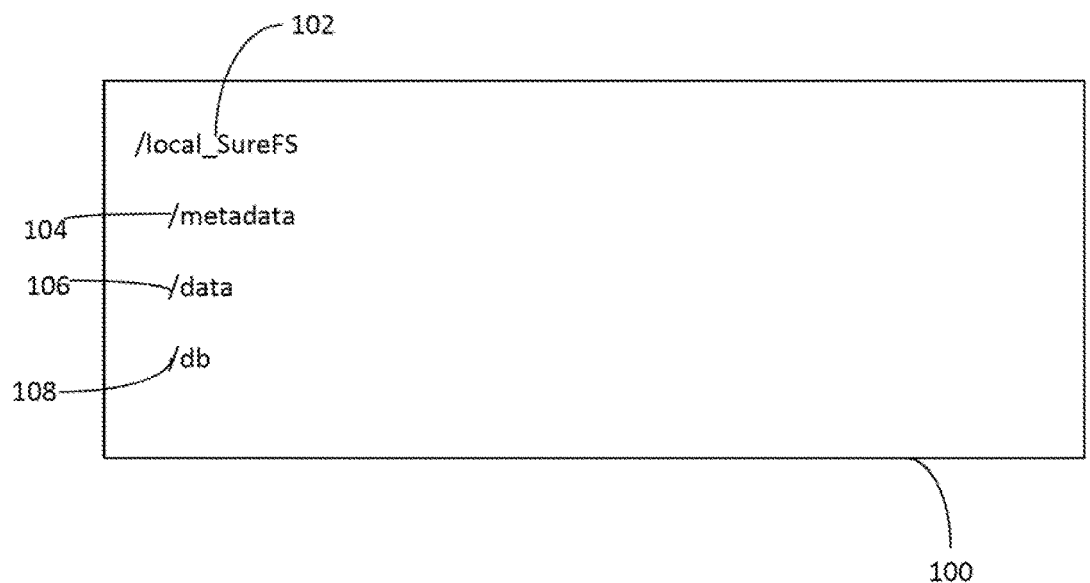
FIG. 1 illustrates an example layout for a local file system layout for storing dedupe images, according to some embodiments.

The Figures described above are a representative set, and are not an exhaustive with respect to embodying the invention.

DESCRIPTION

Disclosed are a system, method, and article of manufacture of methods and systems of a dedupe storage network for image management. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may he combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may he practiced without one or more of the specific details, or with other methods, components, materials, and so forth. In other instances, well-known structures, materials, or operations are not shown or described in detail to avoid obscuring of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided, to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application server can be, inter alia, a software framework that provides a generalized approach to creating an application-server implementation, regard to what the application functions are and/or the server portion of a specific implementation instance. The server's function can be dedicated to the execution of procedures (e.g. programs, routines, scripts) for supporting its applied applications. An application server can be an example of a physical server.

A backup, or the process of backing up, can refer to the copying and/or archiving of computer data so it may be used to restore the original after a data loss event.

Backup window period of time when backups are permitted to run on a system.

Backup image (or image) can include copies of programs, system settings, files, etc. It can be a complete system backup that can be used for restore operations.

Bloom filter can be a space-efficient probabilistic data structure that is used to test whether an element is a member of a set. False positive matches may be possible, but false negatives are not, thus a Bloom filter can have a one-hundred percent (100%) recall rate.

Chunk (also a 'data chunk') can he the segments of data that are generated from a data stream by splitting. the data stream at fixed or variable lengths. A chunk can be a specified fixed size or variable size.

Cloud computing can be computing that can involve a large number of computers connected through a communication network such as the Internet. Cloud computing can be a form of distributed computing over a network, and can include the ability to run a program or application on many connected computers at the same time.

Cloud storage can be a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Data deduplication can be a technique for reducing the amount of storage space (e.g. eliminating, duplicate copies of data).

Fingerprint can be a small key that uniquely identifies data, a file, etc.

Mesh network can be a network topology in which each node relays data for the network. All nodes cooperate in the distribution of data in the network.

Onsite can mean that a dedupe storage node which initiates the replication upload/download.

Replication site can be the dedupe storage node where data is pushed or fetched from. Replication can mean the uploading of the dedupe image to the replication partner.

Exemplary Methods

In some embodiments, a dedupe file system can be implemented for storing and replicating backup images. The dedupe storage network can have to graph topology of one-to-many, many-to-one, and/or many-to-many replication sites. Given any graph topology, it can be converted into a dedupe storage network. For example, the dedupe storage network for dedupe image management can be built using a mesh network topology. The nodes in the graph topology can represent single dedupe store. The edges between these nodes can represent the replication link between two (2) dedupe stores.

If a dedupe chunk is present at any of the dedupe store then none of its various replication partners can replicate the data chunk to the same dedupe store. In this way, band optimizations can be achieved. Replication can be bidirectional. For example, a node can upload images to a replication partner and/or download images from a replication partner. Every dedupe store can have its local file system. All the dedupe images can he stored an the local hard disk (and/or other storage medium) of that particular dedupe store. Each dedupe store can also have a remote file system per replication partner. The remote file system can have the metadata of the dedupe images which have been replicated to the replication partner The remote file system can also has the database of the data chunks. The data chunks can also duplicated to the replication partner. Accordingly that particular image can become available on the local hard-disk of the dedupe store such that that the image can become the local image on the replication partner. When an image is expired from a local store, it can then be downloaded from a replication partner.

The dedupe file system can be an inline deduplication file system. The dedupe file system can convert an incoming backup stream to a dedupe image without requiring a staging location. The dedupe file system can store the backup stream by chunk-wise deduplication, compression and/or encryption. Various details of exemplary dedupe file systems are now provided.

FIG. 1 illustrates an example layout for a local file system layout 100 for storing dedupe images, according to some embodiments. The dedupe file system is used for storing dedupe images in local file system (fs) (e.g. represented by directory/local_SureFS 102). Metadata container (e.g. represented by/metadata/104) can store the metadata for all the dedupe images. For every dedupe image 'X', there is a corresponding directory inside the metadata container. This directory can store the metadata related to the dedupe image. In some embodiments, three metadata files types cart be utilized. A stream_map file type can be a list of tuple<offset, length, fingerprint of chunk>. The stream_map file type can describes sequential contents of entire dedupe image. The stats file type can include other stats information, such as, inter alia: time of creation, actual size of stream, dedupe size of stream, number of data chunks in stream etc. The backup_app file type can include all the important information utilized by backup application, such as, inter alia: origin of this data, replication policy, retention policy etc.

The data container (e.g. represented by/data 106) can store each of the dedupe chunks in the form of separate files. The names of these files are the ASCII (American Standard Code for Information Interchange) representation of their respective fingerprint values. In one example, there are sixty-four thousand (64,000,000) buckets can be created inside the data container, For every dedupe chunk, a hash can be calculated. The hash can be used to decide in which bucket the chunk is to he stored. For example, consider a dedupe chunk has fingerprint 'c169618845ad8e9d4a5f aa238 e9e68152d38c7503cdb942f'. The hash function can calculate a bucket number 50044 for this chunk. The data chunk can then be stored as file with pathname: ./data/ 50044/c169618845ad8e9d4a5faa238e9e68152d38c7503 cdb942f. The fingerprint and the hash algorithm can be universal for all the sites included in the dedupe storage network. This can ensure sure that any data chunk will have only a unique path location across all the sites in the dedupe storage network.

Local fs can utilize a database (e.g. represented as /db 108) as a bloom filter to check whether a certain data chunk with given fingerprint exists. The database can have a list of fingerprints of present data chunks. The database may not have reference counts or the location identifiers. Accordingly, garbage collection can be implemented without reference counts and the chunk location can he decided by the hash function. Thus the database is can be small and fit into a main memory.

Figure 2:
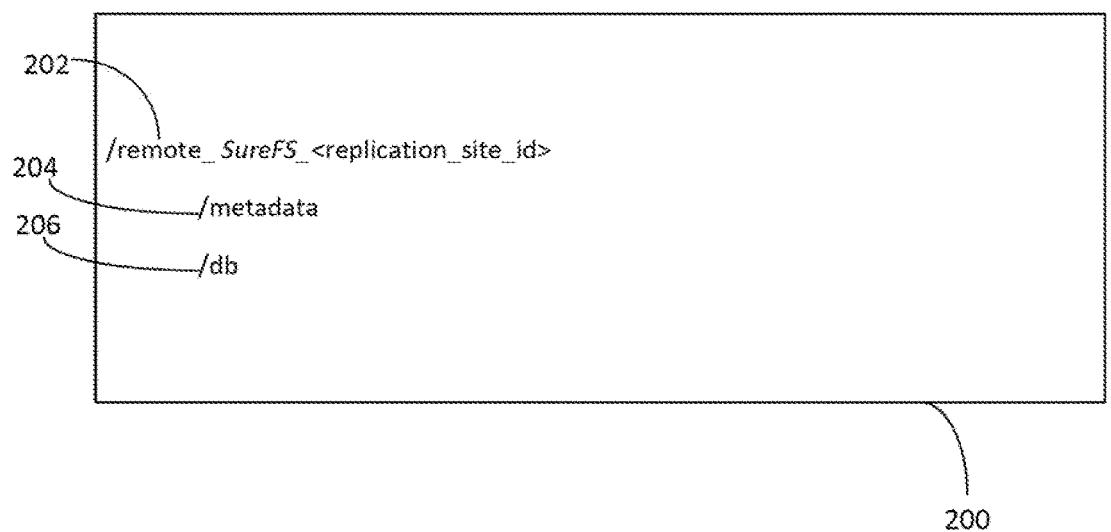
FIG. 2 illustrates an example layout of a dedupe file system design for replicating dedupe images layout for storing dedupe images, according to some embodiments.

FIG. 2 illustrates an example layout for a dedupe file system design for replicating dedupe images layout 200 for storing dedupe images, according to some embodiments. A dedupe file system can be used for replicating dedupe images as a remote fs. For every site, there can be a remote A per a respective replication peer. The layout of dedupe file system is used for representing replicated dedupe images in remote file system (e.g. represented by directory/ remote_SureFS_<replication_site_id>202) is now provided. The layout of dedupe file system is used for representing replicated dedupe images in remote file system (e.g. represented by directory/remote_SureFS_<replication_ site_ id>202) is now provided.

A remote fs can use database (e.g. represented by /db 206) as a Bloom filter. The Bloom filter can check whether a certain data chunk with given fingerprint exists at the replication site with identifier: replication_site_id. The database can include a list of fingerprints of data chunks replicated to the replication site.

It is noted that the replication events in the dedupe storage network cab be dedupe preserving and wide-area network (WAN) optimized. To optimize the network I/O, it can be determined if a data chunk is present at a site. If yes, then the same data chunk is not replicated to that site from any of the other site in the dedupe storage network. When a site is uploading an image to a replication site, it can only upload data chunks included in that image which are not present on the replication site. Similarly when a site is downloading an image front replication site, it can only download data chunks included in that image which are not present locally at that site.

Figure 3A:
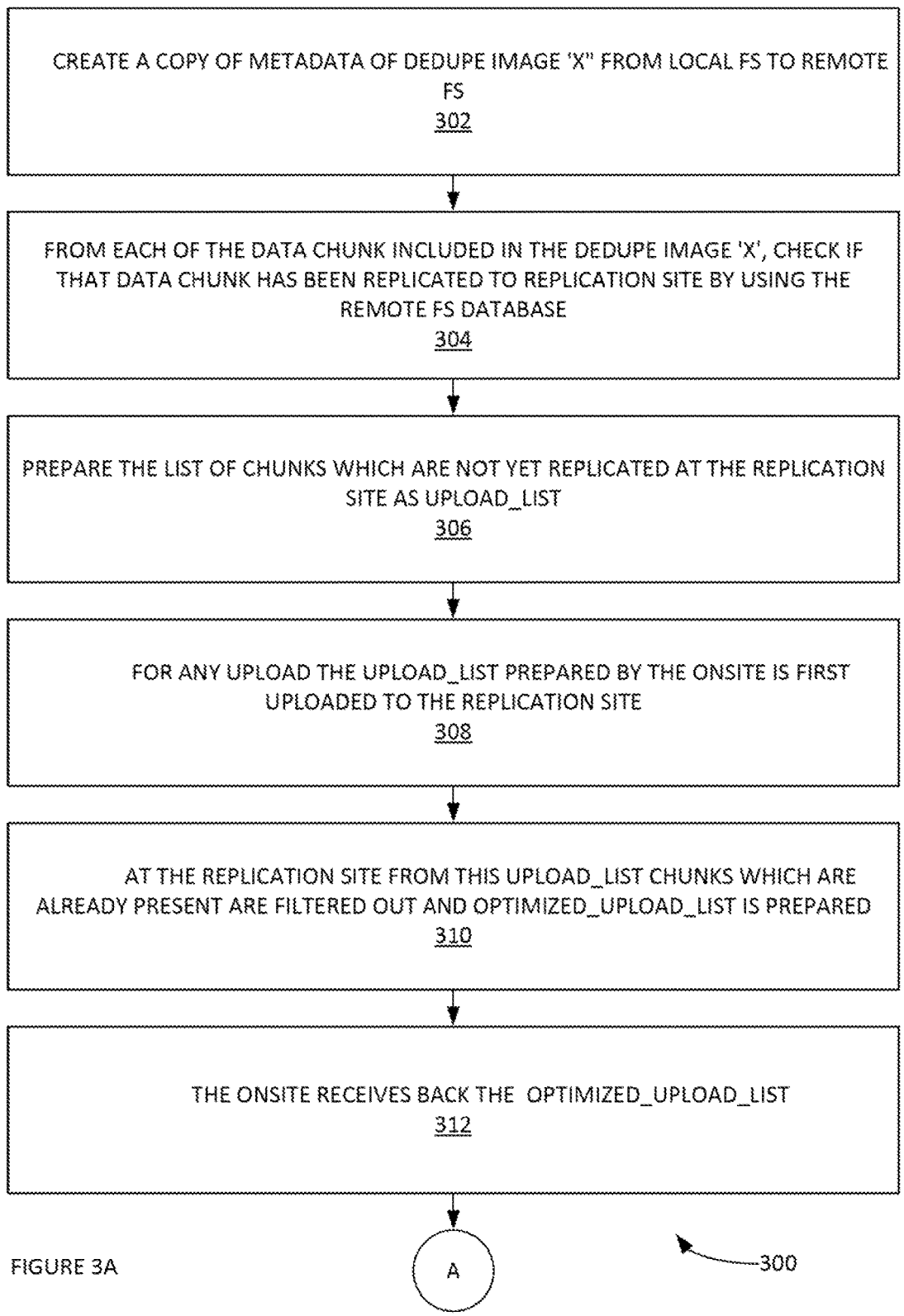
FIGS. 3 A-B illustrate an example process for uploading an image to replication site, according to some embodiments.
Figure 3B:
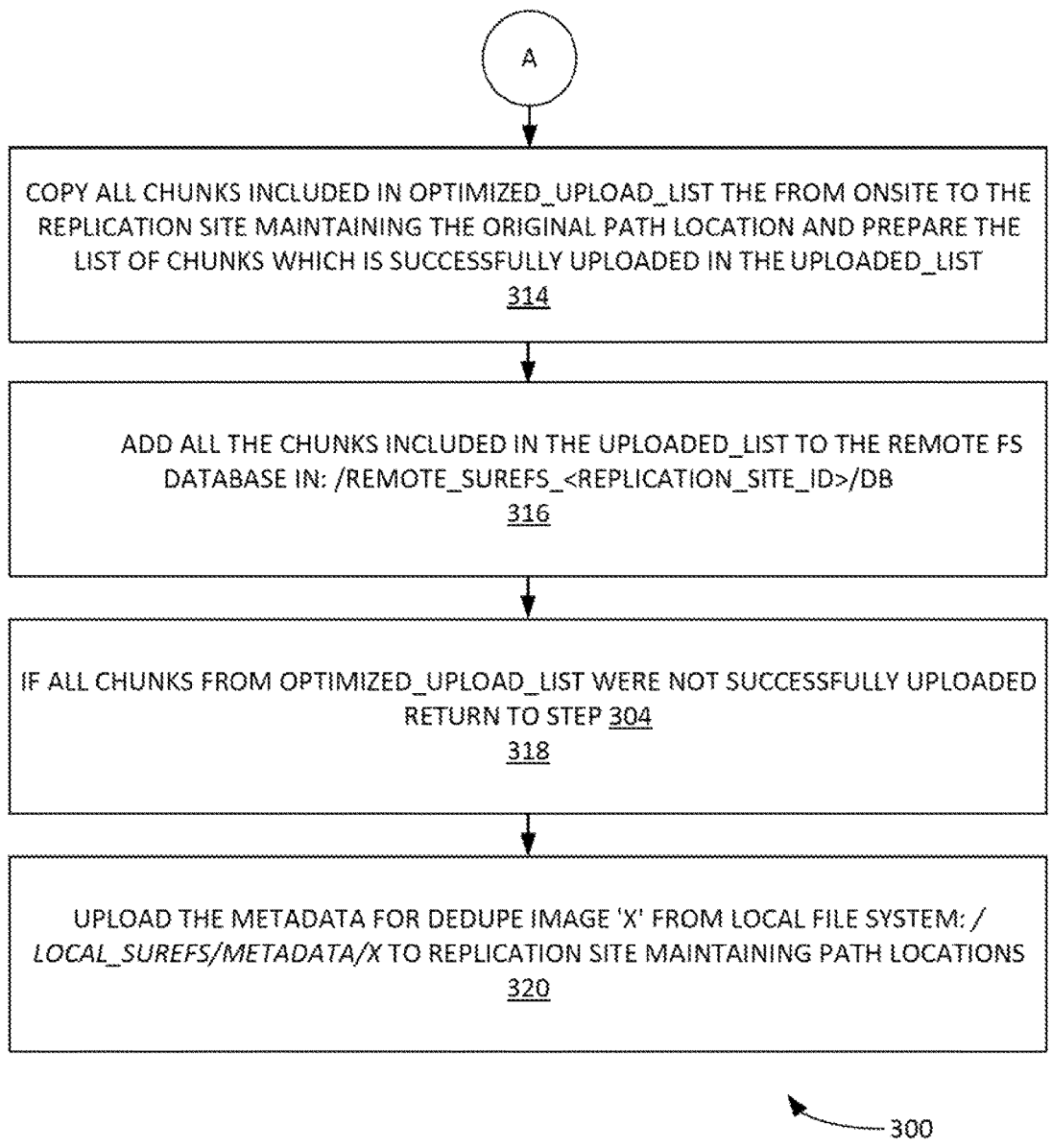

FIGS. 3 A-B illustrate an example process 300 for uploading an image to replication site, according to some embodiments. The remote fs database of an dedupe site can include a list of chunks uploaded by the dedupe site to replication site. This list can be a subset of chunks present at the replication, site. It may be the case that many other chunks may get created at the replication site as a result of backups happening at that site as well as replications happening from other sites in the network. Accordingly, in some embodiments, process 300 can be used to upload dedupe image 'X' from onsite to replication site with ID: replication_site_id.

In step 302 of process 300, a copy of metadata of dedupe image 'X' can be created from local fs to remote fs. For example, a copy of metadata of dedupe image 'X' can be created from local fs to remote fs (e.g. from /local_SureFS/ metadata/X to /remote_SureFS_<replication_<site_id>/ metadata/X. This can signify that image X is available at the replication site \hose id is: replication_site_id. In step 304, from each of the data chunk included in the dedupe image 'X', it can be checked if that data chunk has been replicated to replication site by using the remote fs database (e.g. from: /remote_SureFS_<replication_site_id>/db). In step 306, the list of chunks which are not yet replicated can be prepared at the replication site as upload_list. In step 308, for any upload the upload_list prepared by the onsite can be first uploaded to the replication site. In step 310, at the replication site from this upload_list chunks which are already present are filtered out and optimized_upload_list is prepared. In step 312, the onsite can receive back the optimized_ upload _list. In step 314, all chunks included in optimized_upload_list can be copied from the onsite to the replication site. It is noted that the original path location can be maintained. The list of chunks which are successfully uploaded in the uploaded_list can be prepared. In step 316, all the chunks included in the uploaded list can be added to the remote is database in: /remote_SureFS_ <replication_id>/db. In step 318, if the chunks from optimized_upload_ list were not uploaded successfully, then process 300 can return to step 304. In step 320, the metadata for dedupe image 'X' can be uploaded from local file system (e.g. / local_SureFS/metadata/X) to replication site maintaining path locations.

FIG. 4 illustrates an example process 400 of how an image (e.g. image 'X') can become a locally-available dedupe image to the replication site after uploading, according to some embodiments. Process 400 can be used download image from a replication site. In process 400, an onsite can download an image that it has replicated to a replication site.

Process 400 can include a procedure to download dedupe image 'X' from replication site with ID: replication_site_id. Accordingly, in step 402 of process 400, a copy of metadata of dedupe image 'X' can be copied from remote fs to local fs (e.g. from /remote_SureFS_<replication_site_id>/metadata/X to /local_SureFS/Metadata/X). This can signify that image 'X' is now available locally, Step 404 can check each data chunk included in the dedupe image 'X' to determine that the data chunk is available on onsite by using the local fs database (e.g. from: /local_SureFS/db and/or by checking existence of data chunk on disk using the predefined pathname for the chunk based on hashing algorithm). In step 406, the list of chunks which are not available on onsite as download_list can be prepared. In step 408, all chunks included in download_list can be copied from replication site to onsite. The copy operation can be implemented while maintaining the original path location. The list of chunks which gets successfully downloaded in the downloaded_list can be prepared. In step 410, all the chunks included in the downloaded_list can be added to the local fs database (e.g. in: /local_SureFS/db). In step 412, if all chunks from download_list were not downloaded successfully, then process 400 can return to step 404. Process 400 in one method of how image can become a locally available dedupe image to the onsite after downloading.

The present methods and systems can provide many-to-many replication model in the dedupe storage network. Every dedupe store can have its one local file system where all local images are stored. The dedupe store can have a replication partners and n-remote file systems per replication partner. Each remote file system can contain the metadata of dedupe image which are present at the replication partner as well as the dedupe chunks which are replication by the storage node to its replicated partner.

Exemplary Systems

Figure 5:
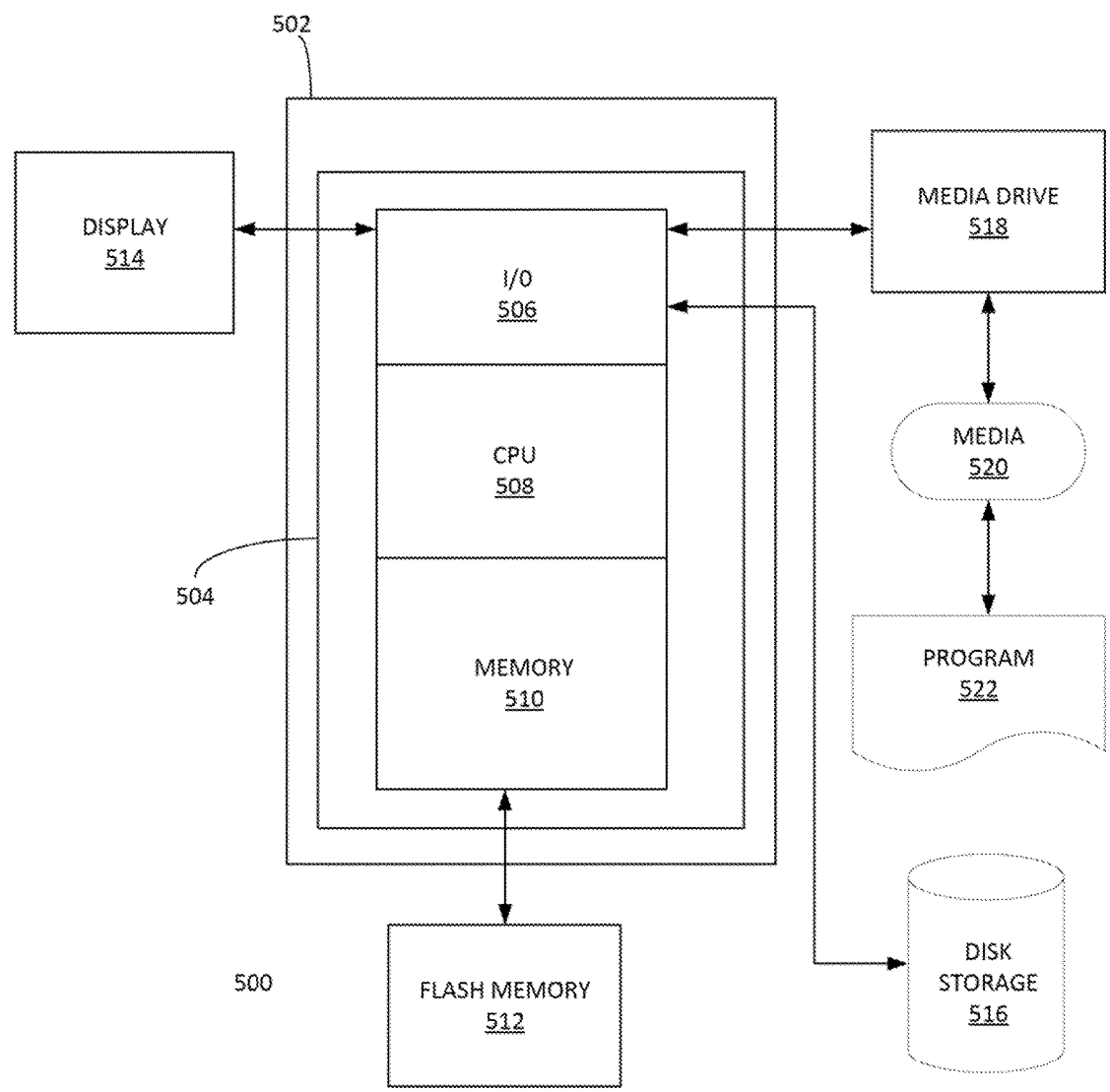
FIG. 5 depicts an exemplary computing system that can be configured to perform any one of the processes provided herein.

FIG. 5 depicts an exemplary computing system 500 that can be configured to perform any one of the processes provided herein In this context, computing, system 500 may include, for example, a processor, memory, storage, and devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing, units (CPU) 508, and a memory section 510, which may have a flash memory card 512 related to it. The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic dedupe area communication protocol, etc.

It is noted, after the system is recovered on the cloud by the cloud appliance, the cloud-appliance can be configured to regularly backup the recovered system running on the cloud. Accordingly, multiple images corresponding to the system running on the cloud can be captured and stored by the cloud appliance. The cloud-appliance can detect the unique data chunks of these backup images and uploads these data chunks to the cloud storage. The cloud-appliance can integrate with the cloud infrastructure APIs to discover any other systems running in the cloud. The cloud-appliance can be configured to regularly backup these systems (e.g. are manually created in the cloud).

It is noted, that after the system is recovered and running on the cloud, the cloud-appliance can bark up the system regularly. The system can upload unique data chunks to cloud storage. In the event a user would like a server image back on the on-site premises, the following steps can be performed. At the location where the customer wants the image back, the user can power-on another on-site appliance and configure it to regularly download new unique data chunks from the cloud storage. When all the unique data chunks for an image are downloaded, the on-site appliance can restore this image.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method of a dedupe storage network comprising:
    providing one or more replication-site dedupe storage nodes;
    providing an onsite-dedupe storage node, wherein the onsite dedupe node initiates a replication operation, wherein the replication operation comprises the onsite dedupe storage node operation pushing or fetching a dedupe-image data from the one or more replication-site dedupe storage nodes;
    storing the dedupe image in the onsite-dedupe storage node represented in a local dedupe-image layout, wherein the local dedupe-image layout comprises a metadata element, a data element and a database element; and
    replicating the dedupe image in the one or more replication-site dedupe storage nodes, wherein a replicated dedupe image is represented in a remote dedupe-image layout comprising a remote-metadata element and a remote-database element, and
    wherein the dedupe storage network comprises an inline deduplication file system that converts an incoming backup stream to a dedupe image without requiring a staging location and stores the incoming backup stream by a chunk-wise deduplication operation, and
    wherein the dedupe storage network comprises a mesh-network topology in which each node relays data for the dedupe storage network, and
    wherein the database element of the local dedupe-image layout identities a database of the onsite-dedupe storage node that is used as a bloom filter to check whether a certain data chunk with a specified fingerprint is extant.

2. The computer-implemented method of claim 1, wherein the metadata element of the local dedupe-image layout identities a metadata container of the onsite-dedupe storage node for storing metadata of the dedupe image.

3. The computer-implemented method of claim 2, wherein each dedupe image stored in the onsite-dedupe storage node there is a corresponding directory inside the metadata container.

4. The computer-implemented method of claim 1, wherein the data element of the local dedupe-image layout identifies a data container that stores each dedupe chunk of a dedupe image in a file, and wherein a name of the file is an ASCII representation of fingerprint value of the file.

5. The computer-implemented method of claim 4, wherein the database includes a list of fingerprints of data chunks present in the database, and wherein the list of fingerprints of data chunks does not include a reference count or a location identifier.

6. The computer-implemented method of claim 1, wherein the remote-metadata element identifies another metadata container that stores all the metadata for all the dedupe images replicated to the replication-site dedupe storage node.

7. The computer-implemented method of claim 1, wherein remote-database element identifies a database in the replication-site dedupe storage node that is used as a bloom filter to check whether a specified data chunk with a specified fingerprint exists at the replication-site dedupe storage node.

8. A method of downloading a deduped image from a replication-site dedupe storage node comprising:
    providing a replication-site dedupe storage node;
    providing an onsite-dedupe storage node that stores a dedupe image, wherein the onsite dedupe node initiates a download operation, and wherein the onsite-dedupe storage node is represented in a local dedupe-image layout;

copying a metadata of the dedupe image from the replication-site dedupe storage node to the onsite-dedupe storage node;

checking each data chunk of the dedupe image to determine that the data chunk is available on onsite-dedupe storage node by using a local onsite-dedupe storage node;

preparing a download list of data chunks of the dedupe image that are not available on the onsite-dedupe storage node;

copying the data chunks included in download list are from the replication-site dedupe storage node to the onsite-dedupe storage node, wherein the copying is implemented while maintaining an original path location;

preparing another list of data chunks of the download list that are successfully downloaded; and adding the data chunks included in the download to a local database of the onsite-dedupe storage node, and wherein a database element of the local dedupe-image layout identities a database of the onsite-dedupe storage node that is used as a bloom filter to check whether a certain data chunk with a specified fingerprint is extant.

9. A method of uploading a digital image to a deduped image from a replication-site dedupe storage node in a dedupe storage network:

providing a replication-site dedupe storage node;

providing an onsite-dedupe storage node that stores a dedupe image, wherein the onsite dedupe node initiates a download operation, and wherein the onsite-dedupe storage node is represented in a local dedupe-image layout;

copying a metadata of a dedupe image created from the onsite-dedupe storage node to replication-site dedupe storage node;

from each of the data chunk included in the dedupe image, checking that the data chunk has been replicated to the replication-site dedupe storage node using a replication-site dedupe storage node database;

preparing a list of data chunks that are not yet replicated at the replication-site dedupe storage node as an upload list;

preparing an optimized upload list at the replication-site dedupe storage node by filtering out the data chunks of the upload list that are already present;

receiving back the optimized upload list at the onsite-dedupe storage node;

copying the data chunk included in the optimized upload list from the onsite-dedupe storage node to the replication-site dedupe storage node;

adding the data chunks included in the uploaded list to the replication-site dedupe storage node database;

uploading the metadata of the dedupe image from the onsite-dedupe storage node to the replication-site dedupe storage node database while maintaining a path location;

wherein the dedupe storage network comprises an inline deduplication file system that converts an incoming backup stream to a dedupe image without requiring a staging location and stores the incoming backup stream by a chunk-wise deduplication operation, and wherein the dedupe storage network comprises a mesh-network topology in which each node relays data for the dedupe storage network, and wherein a database element of the local dedupe-image layout identities a database of the onsite-dedupe storage node that is used as a bloom filter to check whether a certain data chunk with a specified fingerprint is extant.

* * * * *